United States Patent
Bietzer

(10) Patent No.: US 6,177,041 B1
(45) Date of Patent: Jan. 23, 2001

(54) METHOD FOR FORMING CAP WITH TEAR LINE

(75) Inventor: Steven H. Bietzer, Sunnyvale, CA (US)

(73) Assignee: Portola Packaging, Inc., San Jose, CA (US)

(*) Notice: Under 35 U.S.C. 154(b), the term of this patent shall be extended for 0 days.

(21) Appl. No.: 09/172,721

(22) Filed: Oct. 13, 1998

(51) Int. Cl.⁷ .................................................. B29C 45/44
(52) U.S. Cl. ...................... 264/318; 264/328.1; 264/334; 425/556
(58) Field of Search ......................... 264/318, 328.1, 264/334, 335; 425/556, DIG. 58; 215/254

(56) References Cited

U.S. PATENT DOCUMENTS

| | | | |
|---|---|---|---|
| 3,985,255 | * | 10/1976 | Blair . |
| 4,364,895 | * | 12/1982 | Underwood ........................... 264/335 |
| 4,438,065 | * | 3/1984 | Brown ................................. 264/335 |
| 4,806,301 | * | 2/1989 | Conti .................................. 264/334 |
| 5,061,168 | * | 10/1991 | Fox .................................... 264/334 |
| 5,086,938 | * | 2/1992 | Aichinger ............................. 264/318 |
| 5,232,125 | | 8/1993 | Adams ................................. 222/83.5 |
| 5,368,469 | * | 11/1994 | Ekkert ................................. 425/556 |
| 5,513,763 | * | 5/1996 | Adams et al. . |
| 5,609,894 | * | 3/1997 | Rathbun ............................... 425/556 |
| 5,695,706 | * | 12/1997 | Welsh et al. ......................... 264/328.1 |

OTHER PUBLICATIONS

Rosato, Donald V. et al., Injection Molding Handbook, second edition, pp. 312–313, 1995.*

* cited by examiner

Primary Examiner—Jill L. Heitbrink
(74) Attorney, Agent, or Firm—Flehr Hohbach Test Albritton & Herbert LLP

(57) ABSTRACT

A mold for injection molding of a plastic bottle cap has a cavity which defines the outside slope of the top and skirt of the cap. A core and a core insert fixed to the top of the core define the inside of the cap and constitute a single, non-moving part. A tapered stripper ring below the cavity engages the base of the cap skirt. After the cap has been injected through a hot tip in the cavity, the cavity is retracted. The stripper ring is then elevated relative to the core by means of ejector pins. As this is proceeding, air is released under the top of the cap to break vacuum tending to hold the cap on the cap insert. The cap is thus ejected from the mold. A reduced cycle time is achieved. The wall thickness of the cap may be reduced, thus reducing material cost.

10 Claims, 6 Drawing Sheets

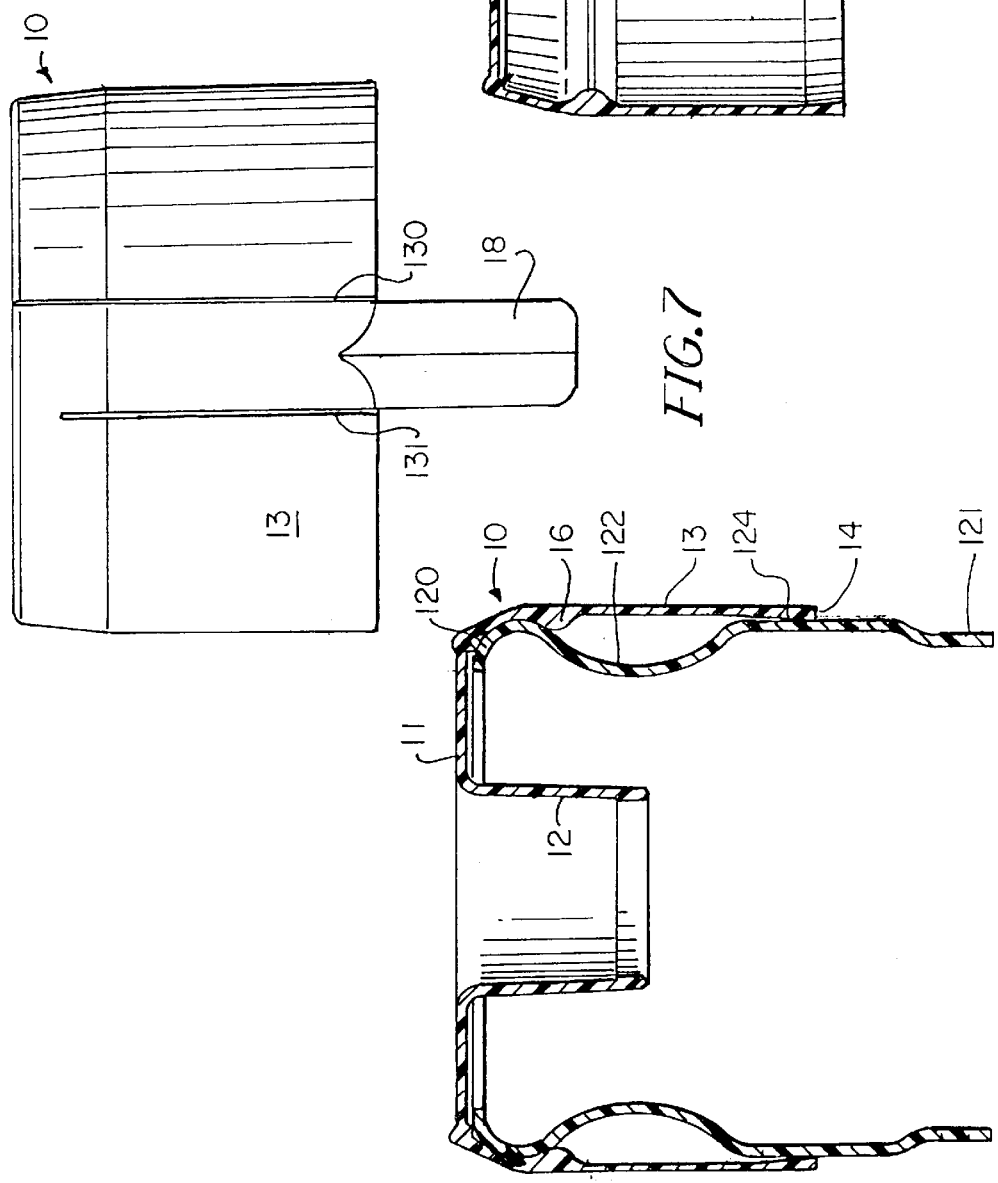

METHOD FOR FORMING CAP WITH TEAR LINE

BACKGROUND OF THE INVENTION

1. Field of the Invention

This invention relates to a new and improved apparatus and method for forming a plastic cap of the type used with five gallon water bottles. More particularly the invention relates to the mold for forming such a cap and the method whereby the cap is fabricated.

2. Description of Related Art

Caps resembling the cap illustrated in the drawings and hereinafter described have been molded on injection molding equipment for many years. The particular cap referred to is similar to part of the disclosure in U.S. Pat. No. 5,232,125. By reason of the molding apparatus and method of the present invention, the cap may be made much more rapidly and with less use of material.

SUMMARY OF THE INVENTION

The cap shown in some of the drawings and hereinafter described is of a particular style known as "non-spill". The well of the cap is closed with a plug and the cap is applied to a bottle such as a five gallon bottle used for spring water and the like. It will be understood that the present invention may be used in the fabrication of other caps wherein there is a top and a skirt depending from the periphery thereof.

The molds hereafter described may be installed in conventional plastic injection molding machines. The molds and the method of forming the cap make possible the use of thinner walls throughout the cap resulting in reduction in the weight of material. In addition, the cycle time for operation of the molding machine is substantially reduced. Reduction in cycle time and reduction in weight are great economic advantages. By way of example, the weight of a cap in accordance with the present invention may be reduced from approximately 13 grams to approximately 8 grams and the cycle time may be reduced from about 15 seconds to about 8 seconds by practice of the present invention.

One of the features of the invention is that the cap is ejected from the mold by pushing upward against the bottom edge of the cap skirt, whereas previously a push pin has pushed against the top of the cap. A push pin method of ejection requires the top wall thickness be much greater then actually necessary for cap function. Otherwise unacceptable top "doming" on ejection will result. A further disadvantage of using a push pin to push up against the underside of the top of the cap is that the top tends to be deformed upward resulting in the upper portion of the skirt being stressed to pull inwardly against the mold, thereby increasing the force necessary to eject the cap and thereby requiring thicker walls. In accordance with the present invention, by pushing upward on the bottom edge of the skirt, the stress on the cap top is considerably less and inward distortion of the skirt of the cap is avoided. This makes possible the thinning of the wall thickness of the cap skirt. Increased wall thickness results in substantial material requirements for prior art closures.

Another feature of the present invention is that in practical effect the core around which the cap is molded does not employ parts which slide relative to each other. In previous mold constructions, the interior of the skirt is defined by a core which is hollow and within the hollow is a push pin which slides relative to the core during a portion of the cycle of operation. Since in accordance with the present invention the parts do not move relative to each other, cooling of the mold is much improved and heat transfer through relatively moving surfaces is avoided.

Still another advantage of the invention is the fact that the parting line between the cavity portion of the mold and the core part of the mold coincides with the bottom edge of the cap skirt. Such a construction makes it possible to include ribbing or design material on the outside of the lower portion of the skirt.

Another feature of the invention is that the stripper ring which originally is in contact with the core and the core have mating upwardly inwardly tapering surfaces. Accordingly when the stripper ring moves upward relative to the core there is no potential for galling which might inhibit movement of the parts. One of the problems with molds heretofore used to fabricate caps of the type used with the present invention is that the parts of the mold tend to gall inasmuch as there are three separate parts in the "lower" part of the mold, all of which must move relative to each other. Further, because the parts slide relative to each other, heat transfer between the mating surfaces is poor because there must be sufficient clearance between the parts to permit such movement. These problems are solved in accordance with the present invention.

BRIEF DESCRIPTION OF THE DRAWINGS

The accompanying drawings, which are incorporated in and form a part of this specification, illustrate embodiments of the invention and, together with the description serve to explain the principles of the invention.

FIG. 6 is vertical sectional view of a cap according to the current invention positioned on the neck of a container.

FIG. 7 is a side view of one form of cap corresponding to the current invention.

FIG. 8 is a vertical sectional view of a different cap embodiment.

DETAILED DESCRIPTION OF THE PREFERRED EMBODIMENT

Figure 1:
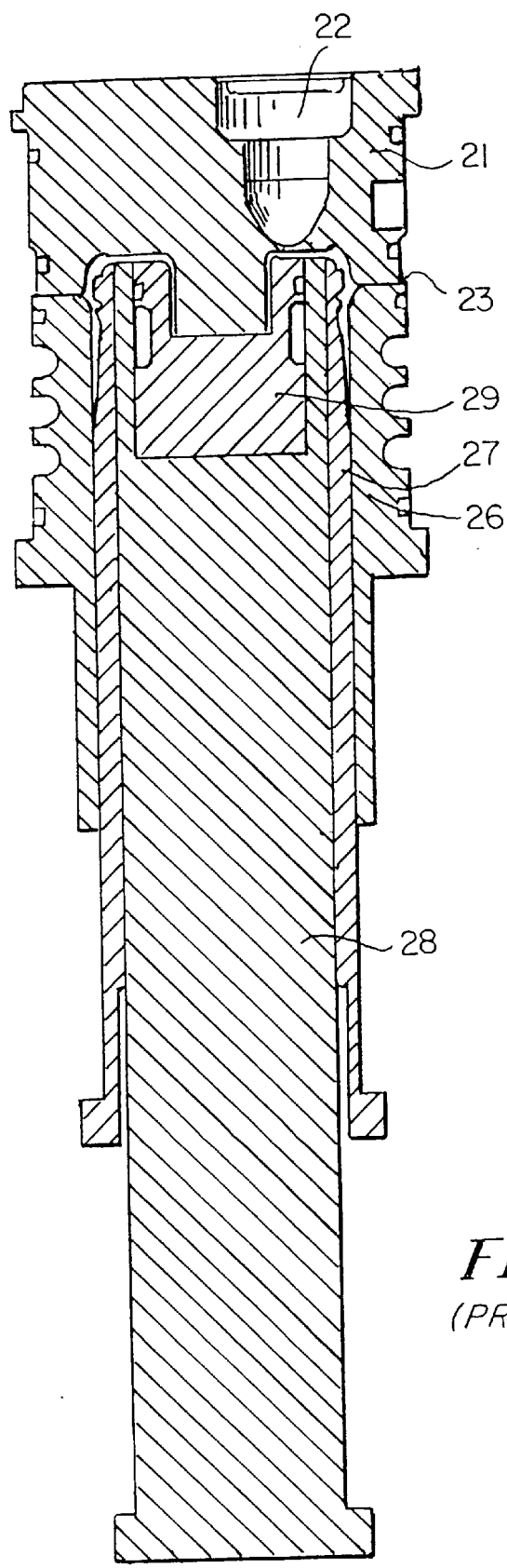
FIG. 1 is a schematic vertical sectional view through a mold used in the prior art.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

A typical cap formed by the molds and method hereinafter described and a complementary bottle finish is best seen in FIG. 6. Cap 10 has a top 11, here shown as being annular, with a well 12 formed centrally thereof. The well 12 is closed with a plug (not shown), all as described in U.S. Pat. No. 5,232,125. The present invention may, however, be used with other caps. For example, the cap 110 shown in vertical section in FIG. 8 is similar to that shown un FIG. 6 with the exception that well 12 is absent in the cap shown in FIG. 8. Referring again to FIG. 6, depending from the periphery of top 11 is a skirt 13 having a bottom edge 14 and an internal locking bead 16 which cooperates with complementary retention structure on a large water bottle (neck finish 121), as well understood in the art. At at least one location on skirt 13 is a tear line (not shown but well understood in the art). One construction to provide for such a tearline is hereafter described. As shown in FIG. 7, depending from the bottom edge 14 is a tear tab 18 located in proximity to the tear line which the user may grip to tear the skirt 13 in order to remove the cap 10 from the bottle neck.

Locking bead 16 fits snugly below the upper "crown" portion 120 of the bottle finish 121. A lower reduced diameter portion 122 of the bottle finish is spanned by the vertically extending lower skirt 13 of the closure 10. At the base of the lower closure skirt the skirt cross-section is caused to be slightly thicker by incorporating an inward projection 124. This inward projection reduces the internal diameter of the cap skirt at its lower terminus resulting in a snug fit between cap and bottle to prevent dirt and other contaminants from gaining access to the upper portion of the finish 121. The thickened section at the base of the cap skirt also facilitates molding of the cap by preventing buckling as the stripper ring pushes up on the base of the skirt during ejection from the mold.

Figure 3:
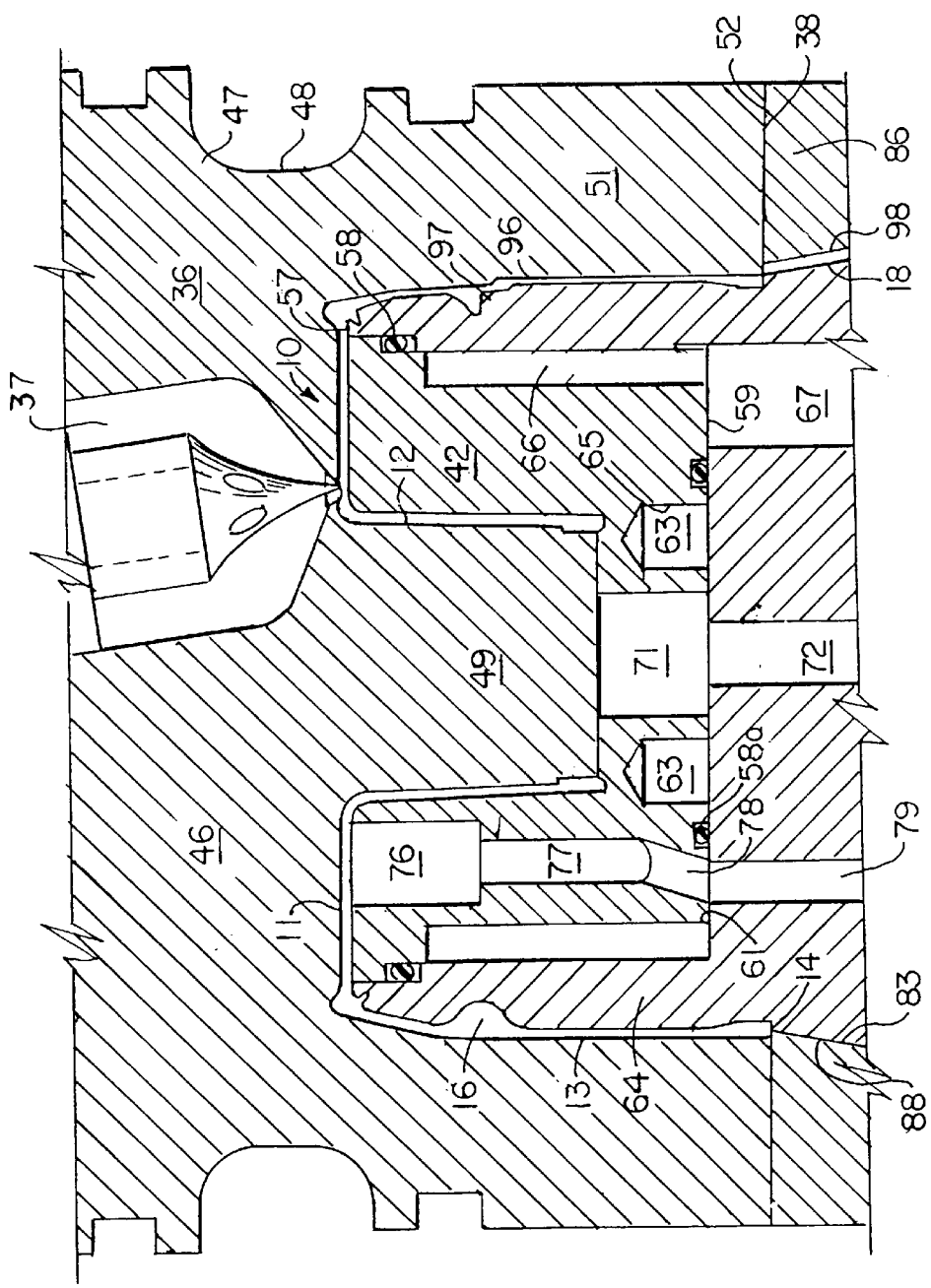
FIG. 3 is an enlarged vertical sectional view through a portion of the mold of FIG. 2.

A line of weakness or tear line is incorporated in at least one location on skirt 13. The tearline allows manual removal of the cap when desired. One construction to provide for such a tearline is illustrated in FIG. 7. In FIG. 7, there is shown a side elevational view of the closure showing essentially vertical score lines 130, 131 positioned in the cap skirt 13 on either side of tear tab 18. At least one of these dual weakened lines extends vertically through locking bead 16. One method of extending the line of weakness through locking bead 16 is shown in FIG. 3, where steel mold projections 96 and 97 combine to extend the line of weakness through bead 16. Only one of the dual score lines 130 extends close to the top of the cap, while the other 131 terminates at a location somewhat below the top. This is done to facilitate removal of the cap from the bottle. It has been found that if both tear lines extend to the top of the cap, continued pulling on the tab actually causes the locking ring 16 to increase its grip on the bottle, making the cap very difficult to remove. When only one tear line extends to the top of the cap, cap removal is greatly improved.

Heretofore caps 10 have been molded in accordance with the mold shown in FIG. 1. The axes of such a mold, as well as that of the mold of the present invention are usually horizontal in use, but are illustrated and described in the specification and claims as vertical. What may be considered the upper part of the mold is commonly called a cavity 21 within which is a hot tip 22 through which molten plastic material (such as low density polyethylene) is injected into the space between the cavity 21 and the lower portion of the mold. In prior mold structure the parting line 23 between the two mold halves is located near, but substantially below, the top of the cap and considerably above the bottom edge thereof.

The lower portion of the mold comprises a core cavity 26. Within core cavity 26 is a sleeve-like core 27 and within the sleeve 27 is a push pin 28. In order to provide for water circulation, a push pin insert 29 is fixed to the upper end of the push pin.

In operation of the prior art mold shown in FIG. 1, with the parts closed as shown in FIG. 1 molten plastic is injected through the hot tip 22 into the space between the two mold halves. Thereupon the upper half or cavity 21 is separated from the lower portion of the mold. Push pin 28 and core 27 move upward relative to core cavity 26, freeing the cap 10 from core cavity 26. When the cap has cleared the core cavity 26, core 27 ceases moving and push pin 28 continues moving, thereby stripping the cap from the core.

As heretofore discussed, the present invention provides considerable advantages over the prior art mold illustrated and hereinabove described.

Figure 2:
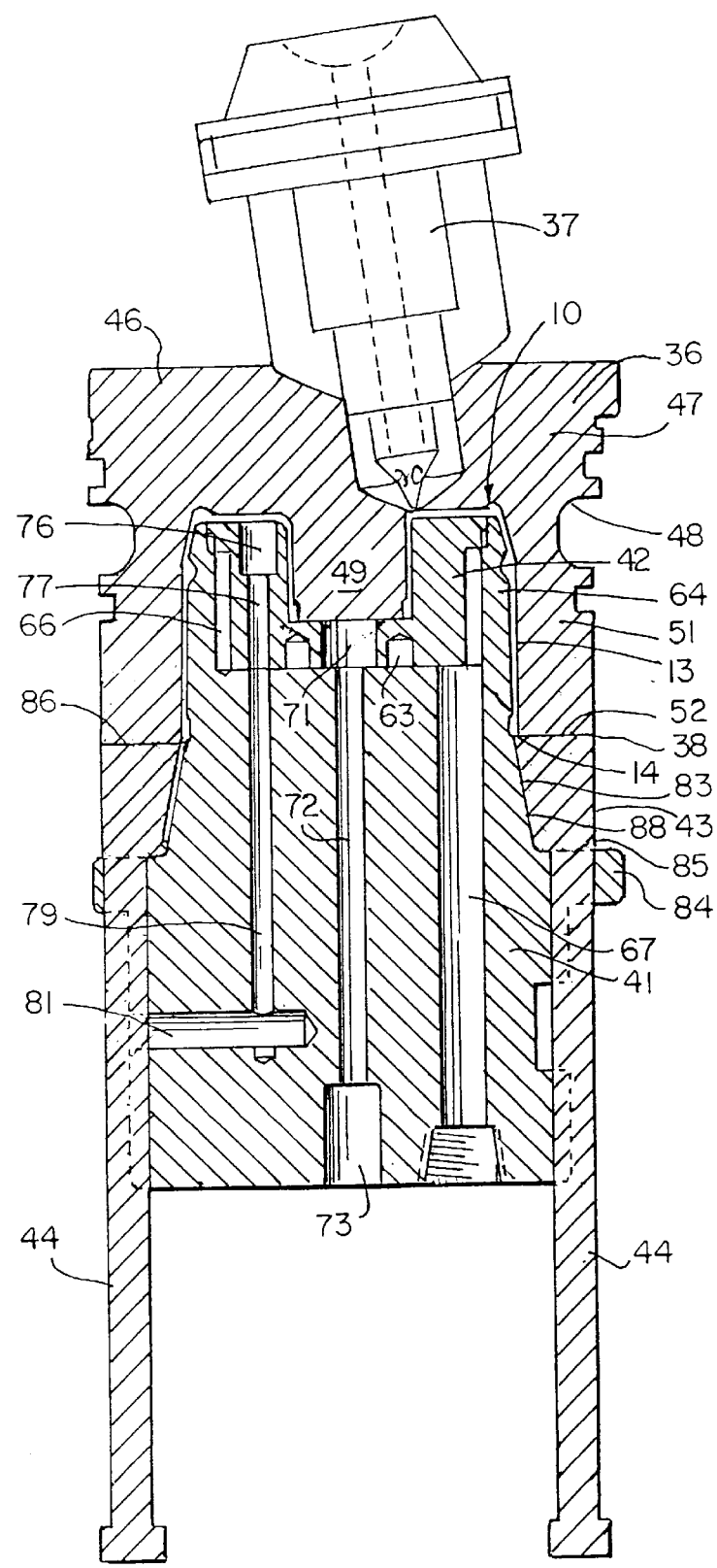
FIG. 2 is a view similar to FIG. 1 showing somewhat schematically a mold in accordance with the present invention.

FIG. 2 shows the two mold halves of the present invention closed. Cavity 36 includes a hot tip 37 here shown at an angle to the vertical axis. It will be understood that the hot tip 37 may be oriented in other positions. The parting line 38 between cavity 36 and core 41 is located at the bottom edge 14 of the cap skirt 13. Fixed to the upper end of core 41 is a core insert 42. On the exterior of core 41 is stripper ring 43 which is moved relative to core 41 by ejector pins 44.

Considering cavity 36 in greater detail and with further reference to FIG. 3, the upper portion 46 thereof determines the shape of the upper surface of top 11 and the inner surface of well 12. There is an annular depending protrusion 51 below top 46. The inside of protrusion 51 determines the shape of the exterior of skirt 13. The lower surface or bottom edge 52 of protrusion 51 (which comprises the parting line between the two mold sections) is at the level of the bottom edge 14 of skirt 13. The exterior of cavity 36 is illustrated in FIGS. 2 and 3 but the details thereof form no part of the present invention. For example, the external groove 48 is for cooling fluid. A central projection 49 from upper portion 46 determines the shape of the inside of well 12.

Core insert 42 fixed to the upper end of core 41 has a top surface 56 which determines the shape of most of the underside of top 11. The shape of the remainder of the underside of top 11 is determined by the tip 57 of core 41. The exterior of the annular extension 64 of core 41 determines the shape of the inside of skirt 13, including bead 16. The bottom 59 of insert 42 fits against the bottom 61 of a bore in core 41, the portion of core 41 outside such bore constituting the annular extension 64 of core 41. Projecting up from surface 61 are dowels 63 which, as best shown in FIG. 3, fit into holes 65, thereby locating insert 42 relative to core 41.

The purpose of using an insert 42 within the extension 64 of core 41 is to facilitate cooling of the members 41–42. Thus, as shown in FIG. 3, there is an annular cooling water groove 66 which communicates with a duct 67 in core 41 and is connected to a source of cooling water. Although not shown in the accompanying drawings, it will be understood that there is another duct 67 through which cooling water from groove 66 may be withdrawn. Seals 58 and 58*a* seal core insert 42 to core 41.

A recess 71 is formed in insert 42 into which is positioned a threaded fastener (not shown) to hold the parts 41 and 42 assembled.

Poppet valves 76 are located at several positions recessed below the top 56 of insert 42. The valves 76 communicate with ducts 77 which in turn communicate with connecting ducts 78 here shown disposed at an angle to the vertical. The ducts 78 communicate with longitudinally extending ducts 79 in core 41. The purpose of the valves 76 is to break vacuum tending to retain cap 10 and particularly the top 11 thereof onto the mold when the cap 10 is stripped from core 41.

As best shown in FIG. 2, the exterior of core 41 comprises a downward outward tapered flank 83 and below the same is a collar 84. In closed position the bottom surface 85 of mold stripper ring 43 rests on top of collar 84 and its top surface 86 mates with the bottom surface 52 of protrusion 51 of cavity 36, the two surfaces 52 and 86 comprising the parting line 38. It will be noted that the interior of ring 43 has an upward-inward tapered surface 88 which mates with surface 83 in the closed position of the mold. Collar 84 is formed with holes in which ejector pins 44 slide to move ring 43 relative to core 41.

In order to form a tear line or thinning of the skirt 13, a rib 96 is fixed to the interior of protrusion 51 (see FIG. 3). To further thin the skirt 13 in the vicinity of bead 16, an insert 97 is added to extension 64. To form pull tab 18, a groove 98 is formed in stripper ring 43 extending downward near to bottom surface 85 of stripper ring 43.

Operation

Figure 4:
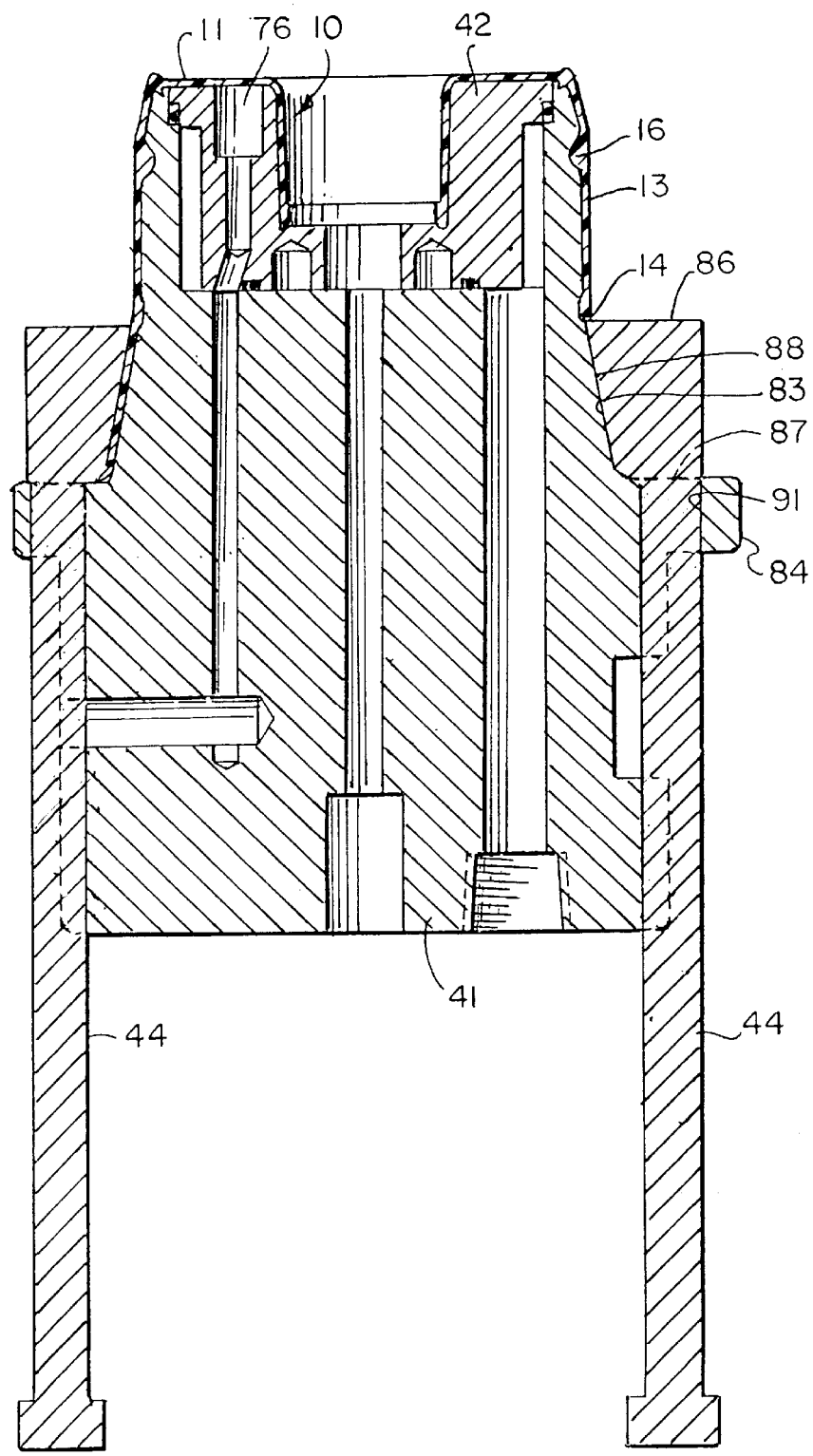
FIG. 4 is a view similar to FIG. 2 showing completion of a step in the operation of the mold.

At the commencement of the cycle of operation the mold halves are closed and the parts are in the position shown in FIG. 2. Molten plastic is injected into the space between the two mold halves from hot tip 37. The next step in operation is the withdrawal of cavity 36, the completion of this step being shown in FIG. 4.

Figure 5:
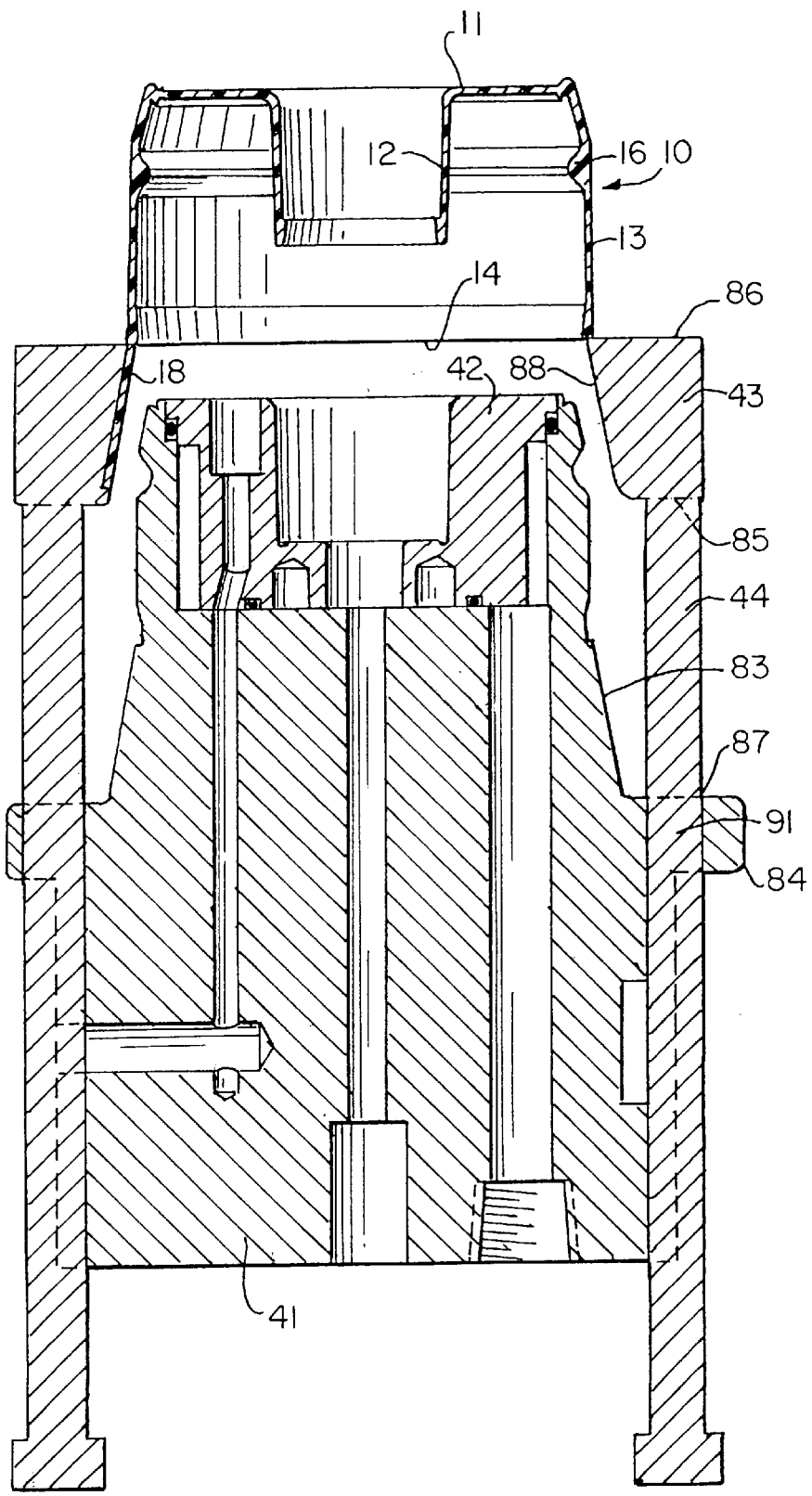
FIG. 5 is a view similar to FIG. 4 of a still later step in the operation of the mold.

The next step in the separation of cap 10 from the mold is accomplished by the ejector pins 44 pushing stripper ring 43 upward relative to core 41. The upper surface 86 of ring 43 engages under the bottom edge or base 14 of skirt 13. Poppet valves 76 supply air under top 11, facilitating breaking any vacuum between of the cap and core 41 and core insert 42. The completion of this step is shown in FIG. 5. The cap 10 is for practical purposes free of the mold halves and in accordance with conventional practice drops by gravity onto a conveyor which removes it from the molding machine. It is noted that as stripper ring 43 begins to move relative to core 41, surfaces 88 and 83 immediately separate, eliminating any potential for galling, which, as discussed above, is a significant problem with the sliding components used in prior art methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of molding a plastic cap having a top and a depending skirt, said skirt having a bottom edge, the method comprising the steps of providing a mold, said mold comprising,
  a cavity having an upper portion including a hot tip for injecting plastic and an annular lower portion, said cavity having a first surface defining the outside of said top and a second surface defining the outside of said skirt, said cavity also having a substantially vertically extending rib on said second surface defining the outside of said skirt, said rib defining a tear line in said skirt,
  an integral core defining the insides of said top and said skirt, said cavity being separable from said core, said cavity and said core being spaced apart a distance to define the wall thicknesses of said top and said skirt, said lower portion of said cavity terminating at the level of said bottom edge,
  a stripper ring on the exterior of said core and separable therefrom, said ring having a top surface positioned below and engaging said lower portion of said cavity,
closing said mold with said ring engaging said core and said cavity engaging said ring,
injecting plastic through said hot tip between said cavity and said core to form said cap, said ring being positioned to engage said bottom edge of said cap,
separating said cavity from said core,
raising said ring relative to said core to lift said cap off said core by pushing said ring against said bottom edge.

2. A method according to claim 1 which further comprises injecting air below the underside of said top during said step of raising said ring to break vacuum between said cap and said core.

3. A method according to claim 1 in which said top of said cap is annular and said cap has a central well, said cavity having a central projection defining the inside surface of said well and said core having a central bore in its top surface surrounding and spaced from said projection defining the outside surface of said well,
  said step of separating said cavity from said core including removing said central projection from the inside of said well.

4. A method according to claim 3 in which said integral core defines the outside surface of said well.

5. A method according to claim 1 in which said skirt is substantially cylindrical and includes a bottom edge and an internal locking bead spaced substantially upward from said bottom edge for engaging a neck on which said cap is applied and an internal second bead on said skirt having a lower portion extending substantially cylindrically upward from said bottom edge,
  said integral core defining said internal locking bead and said internal second bead.

6. A method according to claim 1 in which said skirt depends from said top and is substantially cylindrical, said skirt including an internal locking bead on said skirt spaced substantially upward from said bottom edge for engaging a neck on which said cap is applied and a pair of substantially parallel, substantially vertical external tear lines extending upward from said bottom edge, one said tear line extending higher upward than the other said tear line,
  said integral core defining said internal locking bead, and
  said cavity includes a pair of ribs on said second surface for defining said pair of external tear lines.

7. A method of molding a plastic cap having a top and a depending skirt, said skirt having a bottom edge comprising
  providing a mold, said mold comprising,
    a cavity having an upper portion including a hot tip for injecting plastic and an annular lower portion, said cavity having a first surface defining the outside of said top and a second surface defining the outside of said skirt, said cavity also having a substantially vertically extending rib on said second surface defining the outside of said skirt, said rib defining a tear line in said skirt,
    an integral core including an end and a core insert affixed to said end, said core defining the inside of said skirt and said core insert defining the inside of said top, said cavity being separable from said core, said cavity and said core being spaced apart a distance to define the wall thicknesses of said top and said skirt, said lower portion of said cavity terminating at the level of said bottom edge, a stripper ring on the exterior of said core and separable therefrom, said ring having a top surface positioned below and engaging said lower portion of said cavity, closing said mold with said ring engaging said core and said cavity engaging said ring, injecting plastic through said hot tip between said cavity and said core to form said cap, said ring being positioned to engage said bottom edge of said cap, separating said cavity from said core, raising said ring relative to said core to lift said cap off said core by pushing said ring against said bottom edge.

8. A method according to claim 7 wherein one of said core and said core insert includes an annular cooling groove, said method further comprising circulating cooling water through said cooling groove.

9. A method according to claim 7 which further comprises injecting air below the underside of said top during said step of raising said stripper ring to break vacuum between said cap and said core insert.

10. A method according to claim 7 further comprising affixing said core insert to said end of said core.

* * * * *